Jan. 26, 1965 J. P. BADE ETAL 3,167,685
COMPUTER PROTECTION CIRCUIT
Filed May 8, 1961
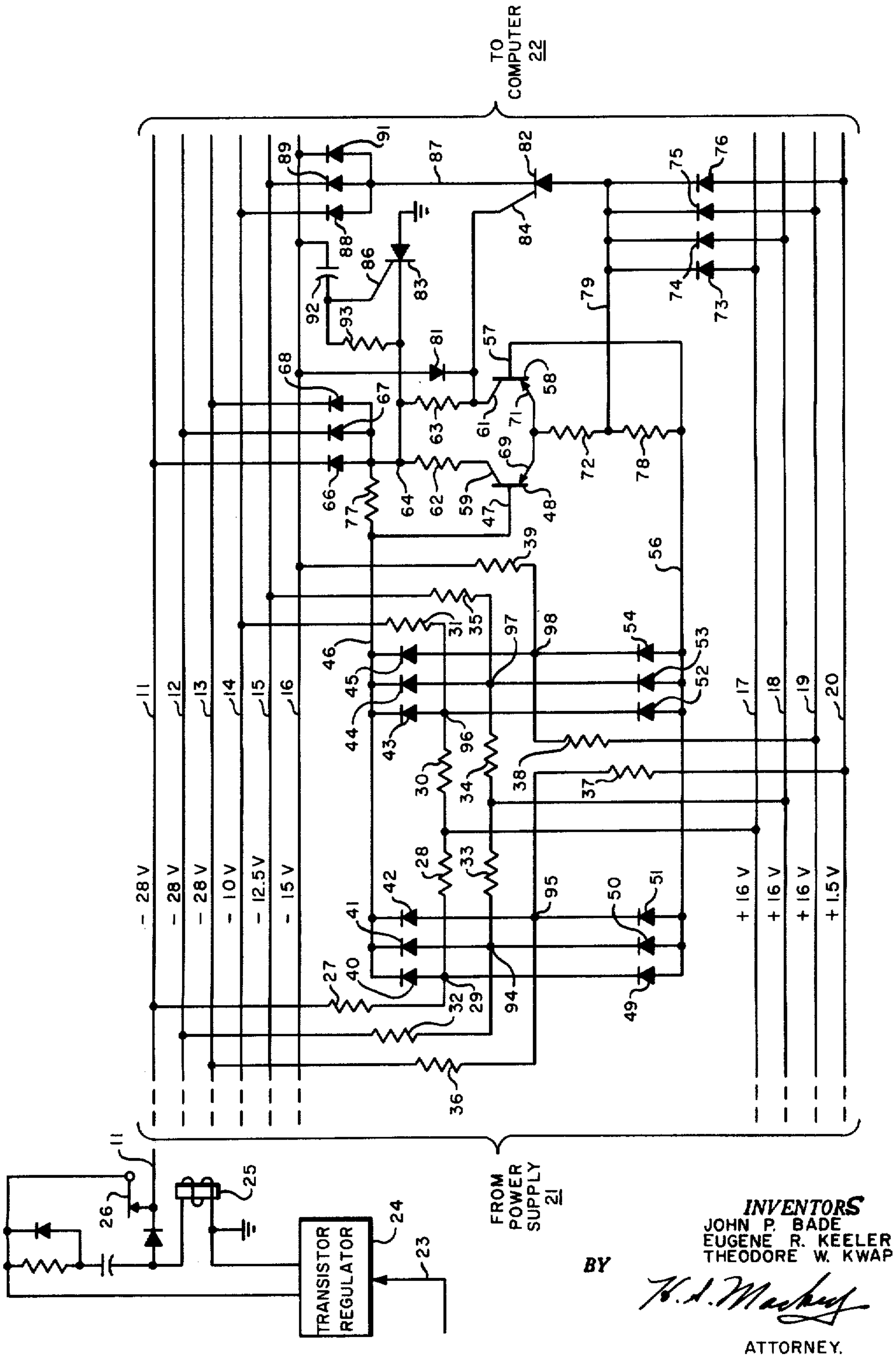
INVENTORS
JOHN P. BADE
EUGENE R. KEELER
THEODORE W. KWAP
BY [signature]
ATTORNEY.

3,167,685
Patented Jan. 26, 1965

3,167,685

COMPUTER PROTECTION CIRCUIT

John P. Bade, New Rochelle, Eugene R. Keeler, Bayside, and Theodore W. Kwap, Brewster, N.Y., assignors to General Precision, Inc., a corporation of Delaware Filed May 8, 1961, Ser. No. 108,373
8 Claims. (Cl. 317—9)

This invention relates to power supplies for computing circuits employing semiconductor components such as diodes and transistors.

Semiconductor components are characterized by small size and often have very small heat capacity. It is necessary, therefore, to remove an overload from such a component in a time measured in microseconds to avoid damage to the component. Computers usually require a plurality of separate power supplies. These supplies, typically, have output potentials ranging from 28 volts to 1½ volts, of either sign, and are usually electronically regulated. The logic circuits of computers are often so interconnected that the failure of one of the power supplies will throw an overload on some logic element served by another power supply, necessitating the use of a fast protective circuit to avoid damage. It is for this reason that when any one of the power supplies fails all of the other power supplies must be disabled.

The present invention provides such a circuit. It operates by sensing the failure of any power supply and, when such failure occurs, removes all of the power supply voltages from the computer in a very short period of time, for example, ten microseconds.

A requirement in some computers containing a data storage element is that, in the event of failure of power, the generation and storage of spurious data must be prevented. In the past either spurious data storage has occurred or the possibility has developed that it may have occurred causing uncertainty as to reliability of the data. In either case it has been necessary at least to examine, and perhaps to replace, all of the stored data. Both operations are time consuming and laborious.

The present invention provides an arrangement for selectively shutting down the power supplies in a selected order which may be arranged so that any stored data are not affected, thus eliminating any necessity for either the inspection or replacement of such stored data.

The operation of the circuit of the invention relies for its success on the design and nature of operation of the power supply. Computer power supplies are generally designed to include in each different voltage supply an overload circuit breaker which will open the circuit in the event of an overload. In the operation of such electronically regulated power supplies, upon imposition of a severe overload and before the circuit breaker can operate, the output voltage collapses to near zero in a matter of microseconds, generally in much less than 10 microseconds.

An additional and severe requirement is that, although the protective circuit is electronic and therefore requires for its operation the service of one of the power supply voltages, protection must be given even in the event that this supply voltage itself is the one which fails. The instant inventive circuit fulfills this requirement also.

The object of this invention is to provide a protective circuit, as an auxiliary to a computer power supply, for the protection of components of the connected computer and for preserving the data stored in the computer from destruction and from erroneous inputs.

A further understanding of this invention may be secured from the detailed description and the drawing, the single figure of which is a schematic diagram of a circuit embodying the invention.

Referring now to the drawing, the bus bar terminals of a series of ten, separate, grounded power supplies of the kind described are indicated by the reference characters 11, 12, 13, 14, 15, 16, 17, 18, 19 and 20. These similar supplies have the nominal output voltages of −28, −28, −28, −10, −12.5, −15, +16, +16, +16 and +1.5 volts, respectively. However, these supply voltages are selected merely as illustrations and the utility of the circuit is not limited thereby. These reference characters indicate power supply bus bars which are connected at one end, 21, to their sources and at the other end, 22, to a computer load.

One of the ten similar power supplies is schematically shown connected to the bus bar 11. This −28 volt supply secures its power from an alternating current supply line 23 through a transistor rectifier regulator 24 which operates as a voltage regulator for light loads but under heavy loads operates as a current regulator. The supply includes an overload relay 25 which breaks the circuit at its contacts, 26, when the output terminal 11 is short circuited to ground or to a grounded positive source. The locked-open power supply is restored to service by opening the power conductor 23 momentarily, then reclosing it.

This power supply is fully described in U.S. patent application Serial No. 59,997, filed October 3, 1960, now Patent No. 3,102,225.

The power supply bus bars are separated into two groups, those above having negative voltages and those below having positive voltages. However, this grouping is not essential. In the event that all of the supply voltages of a power system are of the same polarity but have different voltages, it is only necessary to separate them into a high voltage group and a low voltage group so that a marked or substantial potential difference will exist between any one of one group and any one of the other.

One of the power supplies is distinguished from all of the others in that, in operating the protective circuit, this power supply should be removed first, or at least not second to any other of the supplies. The power supply so designated in this example is the −15 volt supply connected to the bus 16. It is this supply which powers the computer memory or data storage element. In the event of any power failure anywhere this −15 volt supply must be removed instantly to protect the integrity of the data in the memory element.

Six voltage divider circuits are provided each consisting of two resistors, such as the resistors 27 and 28 connected in series. The two opposite terminals of this voltage divider are connected to two of the bus bars, one bus 11, of the upper group and one, 17, of the lower group. The common junction, 29, of the voltage divider is connected to a detection circuit. The resistances of the two resistors 27 and 28 are selected so that, when the two power supplies represented by the connected bus bars 11 and 17 are in normal operation and generating their rated potentials, the potential of the common junction 29 is zero.

The other voltage dividers are similarly connected and their resistances are similarly selected. One voltage divider is composed of resistances 30 and 31 with terminals connected to buses 17 and 14. Another voltage divider is composed of resistances 32 and 33 with terminals connected to bus bars 12 and 18. Still another voltage divider is composed of resistances 34 and 35 with terminals connected to bus bars 18 and 15. A still further voltage divider is composed of resistances 36 and 37 with their terminals connected to bus bars 13 and 20. The sixth and last voltage divider is composed of resistances 38 and 39 with terminals connected to bus bars 19 and 16. Thus each bus bar is connected to one terminal of a voltage divider which has its opposite terminal connected to a bus bar of the other group.

In place of tapped voltage dividers, potentiometers having adjustable sliders may be used, having the advantage of exact adjustability of the midjunction or slider position, and hence its potential, so that all of the six slider potentials will normally be exactly alike.

In the present illustration all six midtaps are connected to detection circuits and the resistances are so designed that the midtap voltages are all normally zero.

The six detection circuits connected to the six midtaps are identical. Each consists of two diodes, one having its anode connected to the voltage divider junction while the other of the two has its cathode connected to the junction. The six diodes 40, 41, 42, 43, 44 and 45 whose anodes are connected to the junctions have their cathodes connected together and through a conductor 46 to the base 47 of a PNP transistor 48. The six diodes 49, 50, 51, 52, 53 and 54 whose cathodes are connected to the junctions have their anodes connected together and through a conductor 56 to the base 57 of a PNP transistor 58.

The transistor collectors 59 and 61 are connected together through resistors 62 and 63. The midjunction, 64, of the resistors is returned to a negative potential by being connected through diodes 66, 67 and 68 to the negative buses 11, 12 and 13. These supply connections serve dual purposes; they energize the transistors and they constitute the paths through which the circuit, when it operates, grounds these bus bars, thus disabling their power supplies. The diodes serve, in normal operation, to prevent the multiple connection from shorting these power supplies to each other, some of which are or may be of different voltages.

The transistor emitters 69 and 71 are connected through a relatively low resistance resistor 72, for example 1000 ohms, to the four positive bus bars 17, 18, 19 and 20 through diodes 73, 74, 75 and 76. The connections to the buses 17, 18, 19 and 20 serve the same dual purposes as previously mentioned in connection with diodes 66, 67 and 68. A 10,000 ohm resistor 77 is connected between terminal 64 and conductor 46, and a second 10,000 ohm resistor 78 is connected between conductors 79 and 56. The collector 61 is normally biased by being connected through a diode 81 to the −15 volt bus 16.

The bus 16 constitutes the energizing source for the protective circuit and is so arranged that a sudden failure of its potential will of itself operate the protective circuit, disabling all power supplies, as will be described. The connection from junction 64 to the buses 11, 12 and 13 also energizes the protective circuit, but this function will not be interfered with except by the simultaneous failure, that is, within the same 2 or 3 microseconds, of all three sources supplying buses 11, 12 and 13. Similarly, although the connections from conductor 79 to buses 17, 18, 19 and 20 act to energize the protection circuit, this function is not affected by the failure of any of these sources unless all four fail simultaneously.

The components 82 and 83 are controlled rectifiers having diode rectification characteristics when conducting. Each has an additional electrode, 84 and 86, termed a gate electrode. The operation of these devices is similar to that of a thyratron, namely, these diodes do not conduct in the forward direction until after a pulse has been applied to the gate electrode, after which conduction continues until the forward current is interrupted or greatly reduced. Controlled rectifiers, sometimes termed silicon controlled rectifiers, are commercially available and are well known to those skilled in the art.

Conductor 79 is connected to the anode of controlled rectifier 82. The cathode thereof is connected through conductor 87 and three diodes 88, 89 and 91 to the buses 14, 15 and 16. The diodes prevent the paralleled connection from shorting together these buses of normally, or possibly, different voltages. The principal function of this connection is to disable these power supplies upon functioning of the protective circuit. The gate terminal 84 is connected to the collector 61.

Junction 64 is connected to the cathode of the controlled rectifier 83, the anode of which is grounded. The gate electrode 86 is connected through a capacitor 92 to the −15 volt bus 16. A bias resistor 93 is connected between the gate electrode 86 and junction 64.

In the normal operation of the ten power supplies, the bus potentials are as indicated and the potentials of the six detection junctions 29, 94, 95, 96, 97 and 98 are all at zero or ground level. The diodes 40, 41, 42, 43, 44 and 45 are all conducting, with about ½ volt drop, so that the potential of the conductor 46 is −½ volt. Since the resistance of resistor 72 is small while that of resistor 62 is large, the emitter 69 of transistor 48 sets itself at about 0.3 volt more positive than its base 47, or at about −0.2 volt, and the transistor 48 is highly conductive. The diodes 49, 50, 51, 52, 53 and 54 having about ½ volt drop, the potential of conductor 56 is about +½ volt. Therefore, since the base 57 is at +½ volt and the emitter 71 is at −0.2 volt, this transistor 58 is nonconductive. The collector 61, being connected to the −28 volt buses through resistor 63, tends to assume that potential, but the diode 81, acting as a limiter, limits its potential to −15 volts. The controlled rectifiers 82 and 83 are nonconductive so long as no positive-going pulses are applied to their gate electrodes.

In describing the operation of the protective circuit, assume that the −28 volt supply connected to the bus 11 fails. The detection junction 29 then becomes positive, changing the potential of conductor 46 and base 47 to some positive value. This makes transistor 48 nonconductive and, because this transistor and transistor 58 are coupled together by resistor 72 to form a difference amplifier, makes transistor 58 conductive. Meanwhile, the positive change in junction 29 has not affected diode 49 and the potential of conductor 56 and of base 57 remains at +½ volt. The potential of collector 61 therefore changes to about zero volts. This change from −15 volts to 0 volt occurs suddenly and constitutes a positive-going 15-volt pulse. This pulse, applied to electrode 84, causes the controlled rectifier 82 to become conductive and capable of carrying relatively very large currents. Rectifier 82 now short circuits the buses 14, 15 and 16 to buses 17, 18, 19 and 20, through the associated diodes 88, 89, 91, 73, 74, 75 and 76. This short circuit causes the voltage outputs of the associated seven power supplies to fall to zero within 10 microseconds and, following this action, causes their respective overload circuit breakers, such as relay 25, to operate, removing them from service.

During this action and before operation of the circuit breakers, since the potential of bus 16 falls abruptly from −15 volts to zero, the resulting positive-going pulse on bus 16 is coupled by capacitor 92 to the gate electrode 86 of the controlled rectifier 83, causing it also to become highly conductive. This immediately grounds the buses 11, 12 and 13 through the associated diodes 66, 67 and 68. The output voltages of the associated power supplies immediately fall to zero within 10 microseconds and thereafter their circuit breakers remove them from service.

The −15-volt supply on bus 16 is a critical supply which must be opened first, or among the first, because it supplies the computer memory device and, if not opened at the first sign of trouble, might cause erroneous data storage. In the circuit given, this supply additionally powers the diode 81 and the controlled rectifier 83, both essential parts of the protective circuit. It is therefore necessary to trace the operation when this circuit fails.

When the potential on bus 16 falls to zero it places a +15-volt surge through diode 81 on the controlled rectifier gate electrode 84. This turns on the rectifier 82, short-circuiting buses 14, 15 and 16 to buses 17, 18, 19 and 20. The same +15-volt surge also passes through capacitor 92 to the gate electrode 86, turning on the controlled rectifier 83 and grounding the buses 11, 12 and 13. Thus initial failure of the memory and service bus 16 causes protective operation of the inventive circuit.

It is thus seen that, by the failure of any negative power supply, the protective circuit operates to remove all power supplies from service, removing the −15 volt supply with the first group removed.

If, instead of negative supply failure, any positive power supply should fail, the protective circuit will operate as follows. Assume that the +16-volt supply connected to bus 17 fails. The junction 29 then becomes negative. This change cannot pass through diode 40, so that the potential of conductor 46 remains at −½ volt, but does pass through diode 49 and makes conductor 56 and base 57 negative. This makes transistor 58 conductive, which in turn causes transistor 48 to become nonconductive. Operation to disable all power supplies thereafter follows the same course as was described.

Thus, by the failure of any positive power supply, the protective circuit again operates to disable all power supplies, the −15 volt supply being disabled among the first.

It is not necessary for the detecting junction to have a normal potential of zero. The potential of the detecting junctions in normal operation may be made whatever is desired just so that it is intermediate between the potentials of the two groups of power sources.

What is claimed is:

1. A protective circuit for a plurality of separate power supplies, some of which at least have different voltage levels comprising, a plurality of comparison circuits each of which interconnects respective pairs of power supplies of substantially different voltage levels, each comparison circuit being adjusted to provide a preselected output voltage at an intermediate terminal thereof under normal power supply operating conditions, means operated by the departure of any one of said intermediate terminals from said preselected output voltage for generating a pulse signal, and electronic means operated by said pulse signal for shorting the outputs of certain of said power supplies to the outputs of certain others of said power supplies.

2. A protective circuit for a plurality of separate power supplies some of which at least have different voltage levels comprising, a plurality of comparison circuits each of which interconnects respective pairs of power supply outputs of substantially different voltage levels, each comparison circuit being adjusted to provide a preselected output voltage at an intermediate terminal thereof under normal power supply operating conditions, means operated by the departure of any one of said intermediate terminals from said preselected output voltage for generating a first pulse signal, electronic means operated by said first pulse signal for shorting the outputs of a first group of power supplies to the outputs of a second group of power supplies, means operated by the shorting of one of said power supply outputs for generating a second pulse signal, electronic means operated by said second pulse signal for grounding a third group of power supply outputs, at least some of said third group of power supplies constituting the energizing source for said first pulse generating means.

3. A protective circuit for a plurality of separate power supplies some of which at least have different voltage levels comprising, a plurality of comparison circuits each of which interconnects a respective pair of power supplies of substantially different voltage levels, each comparison circuit being adjusted to provide a preselected output voltage at an intermediate terminal thereof under normal power supply operating conditions, means connected to the intermediate terminals of all of said comparison circuits and operated by the departure of any one thereof from said preselected output voltage for generating a pulse signal, a controlled rectifier having a cathode connected to certain of said power supplies and an anode connected to certain others of said power supplies, said controlled rectifier including a gate electrode, and means for applying said pulse signal to said gate electrode.

4. A protective circuit for a plurality of separate power supplies some of which at least have different voltage levels comprising, a plurality of comparison circuits each of which interconnects a respective pair of power supply outputs of substantially different voltage levels, each comparison circuit being adjusted to provide a preselected output voltage at an intermediate terminal thereof under normal power supply operating conditions, means connected to the intermediate terminals of all of said comparison circuits and operated by the departure of any one thereof from said preselected value for generating a first pulse signal, a first controlled rectifier having a cathode connected to a first group of power supplies and an anode connected to a second group of power supplies, said first controlled rectifier including a gate electrode, means for applying said first pulse signal to said gate electrode, and a second controlled rectifier having a cathode connected to a third group of power supplies and an anode connected to ground, said second controlled rectifier including a gate electrode capacitatively coupled to at least one of said first group or power supplies.

5. A protective circuit as set forth in claim 4 in which at least some of said third group of power supplies constitute the energizing source for said first pulse generating means.

6. A protective circuit for a plurality of separate grounded power supplies some of which at least have different voltage levels comprising, a plurality of voltage dividers each of which interconnects a respective pair of power supply outputs of different voltage levels, each voltage divider being adjusted to provide a preselected output voltage at an intermediate terminal thereof under normal power supply operating conditions, all of the preselected output voltages of all of said plurality of voltage dividers being substantially identical, diode means connected to the intermediate terminals of all of said voltage dividers and operated by the departure of any one thereof from said preselected output voltage to generate a potential difference between two terminals, a pulse generator connected to said two terminals and operated by said potential difference for generating a first pulse signal, a first controlled rectifier having a cathode connected through isolating diodes to a first group of power supplies and an anode connected through other isolating diodes to a second group of power supplies, said controlled rectifier including a gate electrode, the normal potentials of said first group of power supplies being different from the normal potential of said second group of power supplies, means for applying said first pulse signal to said gate electrode, and a second controlled rectifier having one end of its anode/cathode circuit connected to a third group of power supplies and the other end thereof connected to ground, said second controlled rectifier including a gate electrode capacitively coupled to one of said first two groups of power supplies.

7. A protective circuit for a plurality of separate, grounded power supplies at least some of which have different voltage levels comprising, a plurality of voltage dividers each of which interconnects a respective pair of power supply outputs of different voltage levels, each voltage divider being adjusted to provide a preselected output voltage at an intermediate terminal thereof, all of the preselected output voltages of all of said plurality of voltage dividers being substantially identical, diode means connected to the intermediate terminals of all of said voltage dividers and operated by the departure of any one thereof from said preselected output voltage for generating a potential difference between two terminals, a transistor difference amplifier connected to said two terminals and to a plurality of said power supplies and operated by said potential difference for generating a first pulse signal, a first controlled rectifier having a gate electrode and an anode/cathode circuit, means for applying said first pulse signal to said gate electrode, said anode/cathode circuit being connected to one end through isolating diodes to individual ones of a first group of said separate power supplies and being connected at the other end through isolating diodes to individual ones of a second group of said separate power supplies, the potentials of the power supplies of said first group being higher than the potentials of the power supplies of said second group, and a second controlled rectifier having one end of its anode/cathode circuit connected through isolating diodes to individual ones of the remaining grounded power supplies and the other end thereof connected to ground, said second controlled rectifier including a gate electrode capacitively coupled to one of said first and second groups of power supplies.

8. A protective circuit for a plurality of separate, grounded, power supplies at least some of which have different voltage levels and each of which includes overload circuit breaker means, one of said supplies being a special supply which must be removed from service among the first in the event of a power supply fault comprising, a plurality of voltage dividers each of which interconnects a respective pair of power supply outputs of different voltage levels, each voltage divider being adjusted to provide a preselected output voltage at an intermediate terminal thereof, all of the preselected output voltages of all of said plurality of voltage dividers being substantially identical, diode means connected to the intermediate terminals of all of said voltage dividers and operated by the departure of any one thereof from said preselected output voltage for generating a potential difference between two terminals, a transistor difference amplifier connected to said two terminals and to a plurality of said power supplies and operated by said potential difference for generating a first pulse signal, a first controlled rectifier having a gate electrode and an anode/cathode circuit, means for applying said first pulse signal to said gate electrode, said anode/cathode circuit being connected at one end through isolating diodes to individual ones of a second group of said separate power supplies, the potentials of the power supplies of said first group being higher than the potentials of the power supplies of said second group, said special supply being among said first and second groups, whereby said first controlled rectifier upon receiving said first pulse signal becomes highly conductive connecting said first and second groups together and causing the overload circuit breaker means in each to disconnect the power supply from its load, and a second controlled rectifier having one end of its anode/cathode circuit connected through isolating diodes to individual ones of the remaining grounded power supplies and the other end thereof connected to ground, said second controlled rectifier including a gate electrode capacitively coupled to one of said first and second groups of power supplies, whereby said second controlled rectifier upon its gate electrode receiving change of voltage capacitively coupled thereto from said one of the first and second groups becomes highly conductive grounding said remaining power supplies and causing the overload circuit breaker means thereof to disconnect the power supplies from their loads.

References Cited by the Examiner

UNITED STATES PATENTS 3,037,151 5/62 Cimerman ---------- 317—27

SAMUEL BERNSTEIN, *Primary Examiner.*